United States Patent
Memon

[11] Patent Number: 5,927,620
[45] Date of Patent: Jul. 27, 1999

[54] ACTIVATED METHOD FOR TREATING CRUMB RUBBER PARTICLES

[75] Inventor: Mohammed Memon, Sterling, Va.

[73] Assignee: Phaltech Corporation, Sterling, Va.

[21] Appl. No.: 08/988,949

[22] Filed: Dec. 11, 1997

[51] Int. Cl.$^6$ .......................... B02C 19/00; B02C 19/12
[52] U.S. Cl. ................... 241/17; 241/21; 241/23; 241/24.12; 241/24.17; 241/24.19; 241/27; 241/DIG. 31; 241/DIG. 37
[58] Field of Search ..................... 241/16, 17, 21, 241/23, 24.12, 24.13, 24.17, 24.19, 27, DIG. 37, DIG. 31

[56] References Cited

U.S. PATENT DOCUMENTS

| | | | |
|---|---|---|---|
| 4,240,587 | 12/1980 | Letsch | 241/23 |
| 4,625,922 | 12/1986 | Brubaker et al. | 241/17 |
| 4,789,272 | 12/1988 | Matsubara et al. | 241/DIG. 31 X |
| 4,813,614 | 3/1989 | Moore et al. | 241/23 |
| 4,981,535 | 1/1991 | Hadermann et al. | 241/DIG. 37 X |
| 5,264,640 | 11/1993 | Platz | 241/DIG. 37 X |
| 5,286,374 | 2/1994 | Chen | 208/400 |
| 5,369,215 | 11/1994 | Platz | 241/DIG. 37 X |
| 5,524,838 | 6/1996 | Elers et al. | 241/23 |
| 5,634,599 | 6/1997 | Khais et al. | 241/23 |

*Primary Examiner*—John M. Husar
*Attorney, Agent, or Firm*—Laubscher & Laubscher

[57] ABSTRACT

An improved method for treating crumb rubber particles for use in asphalt compositions is characterized by activating the particles to enhance the rheological properties thereof. A slurry of crumb rubber particles is formed by adding water thereto. The slurry is heated to a temperature of 85–90° C. to release excess oils and chemicals from the particles into the slurry. The slurry is dried to produce a fine mesh rubber product with enhanced rheological properties.

10 Claims, 1 Drawing Sheet

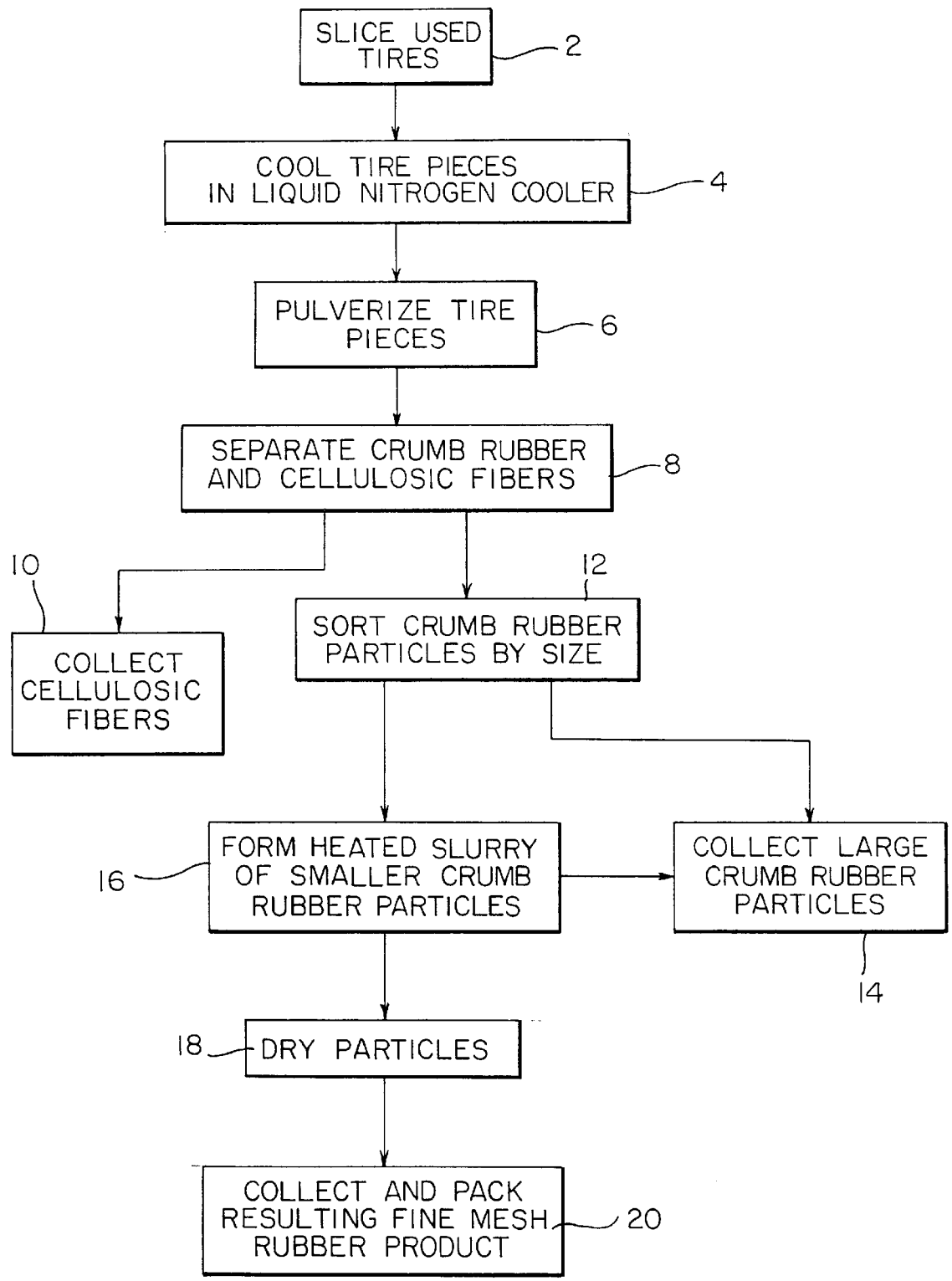

ACTIVATED METHOD FOR TREATING CRUMB RUBBER PARTICLES

BACKGROUND OF THE INVENTION

Most of the asphalt produced in the United States does not accommodate variable weather conditions to which the asphalt is exposed. Accordingly, asphalt is modified in various states to accommodate that state's weather conditions and to qualify for standardized SUPERPAVE protocols. The present invention relates to an improved method for creating cryogenically ground crumb rubber particles used in asphalt compositions to improve the rheological properties thereof.

BACKGROUND OF THE INVENTION

Different asphalt modification processes are currently available to enhance the rheological properties of the asphalt at various temperatures. These processes includes polymer modification, crumb rubber modification, chemical modification, and the production of asphalt flux. Polymer modification enhances the high temperature rheological properties of asphalt, whereas asphalt flux improves only the low temperature rheological properties. Crumb rubber and chemical modification processes provide improvements at high and low temperatures, but chemical modification is more expensive.

Crumb rubber modification is most economical when fine mesh crumb rubber particles such as those obtained from used tires are used. Crumb rubber produced by a cryogenic grinding process can be used to modify asphalt but does not significantly enhance the rheological properties of the asphalt as compared with crumb rubber produced by an ambient grinding process.

The present invention was developed in order to improve the crumb rubber modification to enhance the rheological properties of crumb rubber modified asphalt. The improvement is the result of activating fine mesh crumb rubber produced from a cryogenic grinding process.

SUMMARY OF THE INVENTION

Accordingly, it is a primary object of the present invention to provide a method for treating crumb rubber particles in which water is added to a quantity of crumb rubber particles to form a slurry thereof. The slurry is heated to between 85° C. and 90° C. for a period of at least five minutes to release excess oils and chemicals from the crumb rubber particles into the slurry. The heavier crumb rubber particles are then removed from the slurry following which the slurry is dried resulting in enhanced rheological properties owing to the removal of excess oils and chemicals.

According to a more specific object of the invention, the crumb rubber particles are formed as the result of grinding used tires under cryogenic conditions. The resulting particles of crumb rubber are sorted by size and the larger particles, which are laden with metals, are separated either magnetically or in a cyclone separator.

BRIEF DESCRIPTION OF THE FIGURE

Other objects and advantages of the invention will become apparent from a study of the following specification when viewed in the light of the accompanying drawing, in which:

The FIGURE is a block diagram illustrating the steps according to the improved method for treating crumb rubber particles according to the invention.

DETAILED DESCRIPTION

The activated method for treating crumb rubber particles according to the invention will be described with reference to the FIGURE. The most economical source of rubber material is from used tires. Crumb rubber particles are obtained from used tires by a cryogenic grinding process. Specifically, a quantity of used tires are sliced into small pieces 2 which are then cryogenically cooled in a liquid nitrogen cooler 4 until they become rigid and brittle. The pieces are then ground into smaller particles such as by pulverizing the rigid and brittle tire pieces 6.

As a result of the cryogenic cooling and pulverizing processes, the tire pieces are reduced to a mixture of crumb rubber particles and cellulosic fibers. The cellulosic fibers are then separated from the crumb rubber particles 8. A preferred method for this separating step is to place the mixture in a cyclone separator where the fibers are removed from the crumb rubber particles by centrifugal force. The cellulosic fibers are collected 10 and packed for recycling purposes.

The remaining crumb rubber particles are then sorted by size 12. This sorting step can be implemented using filter screens and/or a magnetic separator. Because many of the tires used as the rubber source contain steel belts, the heavier rubber particles are laden with metal. By passing a large magnet over the crumb rubber particles, the metal laden particles can be collected 14.

The lighter crumb rubber particles are then activated or treated for purification. More particularly, a quantity of water is added to the particles to form a slurry 16. The preferred ratio of crumb rubber particles to water in the slurry is 1:2. The slurry is heated to an elevated temperature, preferable in the range of 85–90° C. The addition of water and the elevated temperature causes the particles to expand which enables excess oils and chemicals in the rubber particles to be released into the slurry. The temperature is elevated for a sufficient period of time, generally five minutes or more, to enable the release of oils, chemicals and some residual metals, from the slurry.

Preferably, the heavier crumb rubber particles in the slurry are separated from the remaining particles. This separation can be accomplished using the cyclone separator and/or an electromagnet. The remaining smaller activated particles are removed from the slurry by gravitational separation. These particles are dried 18, resulting in a fine mesh rubber product which is collected and packed 20 for use in making asphalt.

The vulcanization or curing of rubber with other ingredients such as carbon black used in the manufacturing of tires produces cross-links in the molecular structure. De-vulcanization of rubber occurs during fine mesh grinding. However, there is no activation of the carbon black or rubber, which includes extender oils and the other tire ingredients. It has already been determined that the fine mesh rubber obtained by a cryogenic grinding process will not produce the same rheological results on interaction with asphalt as with ambiently ground rubber. With the activation of the crumb rubber particles according to the invention, enhanced rheological properties are obtained.

Set forth in Table 1 are the test results for cryogenically ground crumb rubber (CRM), ambient ground crumb rubber, and activated cryogenically crumb rubber.

TABLE 1

| SHRP PG Grading | Total Asphalt High Temp. | Fina Asphalt High Temp. | Total Asphalt Low Temp. | Fina Asphalt Low Temp. | Separation % |
|---|---|---|---|---|---|
| Cryogenic CRM | 74° C. | 67° C. | −24° C. | −25° C. | 14% |
| Ambient CRM | 78° C. | 72° C. | −31° C. | −29° C. | 3–4% |
| Activated Cryogenic CRM | 77° C. | 71° C. | −30° C. | −30° C. | 2–4% |

As shown in the test results, the improved method of the invention produces an activated fine mesh crumb rubber which enhances the rheological properties of asphalt for both high and low temperature simultaneously. The activated fine mesh crumb rubber also improves the homogeneity in the asphalt system with the requisite separation.

While in accordance with the provisions of the patent statute the preferred forms and embodiments have been illustrated and described, it will become apparent to those of ordinary skill in the art that various changes and modifications may be made without deviating from the invention concepts set forth above.

What is claimed is:

1. An activated method for treating crumb rubber particles for use in asphalt compositions, comprising the steps of
    (a) grinding used tires under cryogenic conditions to form crumb rubber particles;
    (b) adding water to the crumb rubber particles to form a crumb rubber slurry;
    (c) heating the crumb rubber slurry to release excess oils and chemicals from the crumb rubber particles into the slurry; and
    (d) drying the slurry to produce a fine mesh rubber product with enhanced rheological properties resulting from the removal of excess oils and chemicals from the crumb rubber particles, whereby the rubber product is used to modify asphalt for pavement.

2. A method as defined in claim 1, and further comprising the step of separating larger metal-laden crumb rubber particles from the slurry prior to said drying step.

3. A method as defined in claim 2, wherein said separating step comprises applying a magnetic force to the slurry to remove crumb rubber particles containing metals therefrom.

4. A method as defined in claim 2, wherein said separating step comprises spinning the slurry in a cyclone separator.

5. A method as defined in claim 2, wherein said cryogenic grinding step comprises
    (1) slicing a plurality of used tires into small pieces;
    (2) cooling the pieces until they become rigid and brittle; and
    (3) pulverizing the cooled pieces to form particles of crumb rubber and cellulosic fibers.

6. A method as defined in claim 5, and further comprising the step of separating the crumb rubber particles from the cellulosic fibers.

7. A method as defined in claim 6, and further comprising the step of sorting the crumb rubber particles by size.

8. A method as defined in claim 7, wherein said heating step comprises heating the slurry to a temperature in the range of 85–90° C. for a period of at least five minutes.

9. A method as defined in claim 8, wherein said separating step comprises applying a magnetic force to the slurry to remove crumb rubber particles containing metals therefrom.

10. A method as defined in claim 9, wherein said separating step comprises spinning the slurry in a cyclone separator.

* * * * *